United States Patent

Eriksson et al.

[11] Patent Number: 5,901,221
[45] Date of Patent: May 4, 1999

[54] DRIVING STAGE FOR DRIVING DIFFERENTIAL AMPLIFIERS OF A SUBSCRIBER LINE INTERFACE CIRCUIT

[75] Inventors: Hans Oskar Eriksson, Järfälla; Carl-Henrik Malmgren, Stockholm; Henrik Helmer Hellberg, Solna; Elisabeth Maria Larsson, Bromma, all of Sweden

[73] Assignee: Telefonaktiebolaget LM Ericsson, Stockholm, Sweden

[21] Appl. No.: 08/836,226

[22] PCT Filed: Nov. 8, 1995

[86] PCT No.: PCT/SE95/01322

§ 371 Date: May 7, 1997

§ 102(e) Date: May 7, 1997

[87] PCT Pub. No.: WO96/15592

PCT Pub. Date: May 23, 1996

[30] Foreign Application Priority Data

Nov. 10, 1994 [SE] Sweden .................................. 9403875

[51] Int. Cl.[6] .................................................. H04M 1/00
[52] U.S. Cl. ............................................. 379/399; 379/402
[58] Field of Search ................................ 379/377, 399, 379/413, 338, 402, 397, 398; 330/252, 262, 265; 361/119, 18

[56] References Cited

U.S. PATENT DOCUMENTS

| 4,535,303 | 8/1985 | Schoofs et al. ......................... 330/297 |
| 4,709,388 | 11/1987 | Defretin ................................. 379/413 |
| 4,782,507 | 11/1988 | Siligoni et al. .......................... 379/27 |
| 4,841,175 | 6/1989 | De Man et al. . |
| 5,526,425 | 6/1996 | Meyer et al. ............................ 379/402 |
| 5,596,637 | 1/1997 | Pasetti et al. ........................... 379/399 |
| 5,649,009 | 7/1997 | Enriquez et al. ........................ 379/399 |

FOREIGN PATENT DOCUMENTS

| 275 941 | 7/1988 | European Pat. Off. . |
| 475 507 | 3/1992 | European Pat. Off. . |
| 535 951 | 4/1993 | European Pat. Off. . |
| 535951 | 4/1993 | European Pat. Off. .......... H03F 3/30 |

*Primary Examiner*—Daniel S. Hunter
*Assistant Examiner*—Charles N. Appiah
*Attorney, Agent, or Firm*—Burns, Doane, Swecker & Mathis, L.L.P.

[57] ABSTRACT

In a driving stage for driving the two differential amplifier output stages of a subscriber line interface circuit, the driving stage is adapted to generate four driving currents in dependence on, on the one hand, transversal and longitudinal signals incoming to the driving stage and, on the other hand, a reference current, and to supply these driving currents in pairs to the two inputs of the differential amplifier output stages, all four of the driving currents being larger than zero.

2 Claims, 1 Drawing Sheet

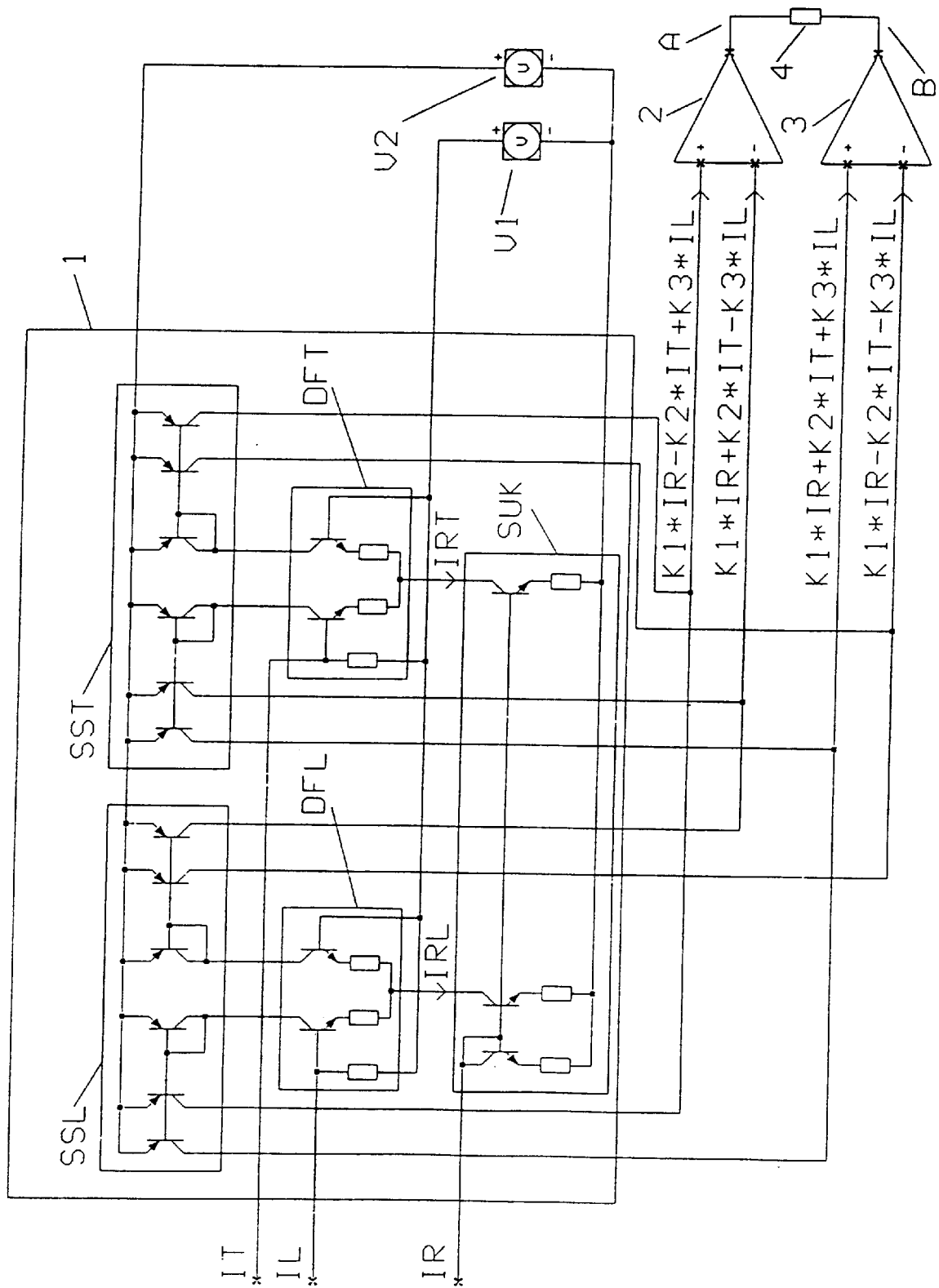

DRIVING STAGE FOR DRIVING DIFFERENTIAL AMPLIFIERS OF A SUBSCRIBER LINE INTERFACE CIRCUIT

This application is a 371 of PCT/SE95/01322 filed on Nov. 8, 1995.

BACKGROUND

The invention relates to a driving stage for driving the two differential amplifier output stages of a subscriber line interface circuit, said driving stage being adapted to generate four driving currents in dependence on, on the one hand, transversal and longitudinal signals IT and IL, respectively, incoming to the driving stage and, on the other hand, a reference current IR, and to supply these driving currents in pairs to the two inputs of the differential amplifier output stages.

A purpose of a subscriber line interface circuit is, among others, to supply a subscriber line with current.

In a switching centre, the subscriber lines are in an idle condition during most of the time, i.e. the lines are open. Since the power losses in the subscriber line interface circuits constitute a considerable portion of the total power loss of the switching centre, it is very important to keep the power losses in the subscriber line interface circuits as low as possible in idle condition as well as during a call.

Normally, the output stages of analogue subscriber line interface circuits are of push-pull-type and operate in class-AB, which means that a certain idle current flows through the same.

Traditionally, the output stages of analog subscriber line interface circuits have been driven by means of current from two driving stages which normally operate between ground or +5V and battery voltage which nominally is –48V in connection with telephony. In order to obtain sufficient linearity in the driving of the output stages, the driving stages usually are designed to work in class-A which means that an idle current always will flow in the driving stages from ground or +5V to the battery voltage. This idle current has to be large enough in order to be able to drive the output stages to the maximum output current that is required, and is therefore dependent on the current amplification of the output stages.

Thus, relatively large currents which are independent of each other flow from ground or +5V to the battery voltage through driving stages and output stages also when the subscriber line interface circuit is not supplying any current. In this idle condition, it is of great importance that the power consumption of the subscriber line interface circuit is low. Considerable contributions are provided by the idle current of the driving stages as well as of the output stages.

Therefore, in the idle condition, the power loss caused by the driving stages and the output stages should be as low as possible.

Moreover, it is of great importance that the driving stages are able to drive the respective output stage across all of the available voltage range.

SUMMARY

An object of the invention is therefore to bring about a driving stage which in combination with the output stage causes a lower power consumption than driving stages known so far at the same time as operation is enabled across all of the voltage range available.

This is attained by means of the driving stage according to the invention in that all four driving currents are larger than zero.

BRIEF DESCRIPTION OF THE DRAWING

The invention will be described more in detail below with reference to the appended drawing on which the single FIGURE shows an embodiment of a driving stage according to the invention for driving the two differential amplifier output stages of a subscriber line interface circuit.

DETAILED DESCRIPTION

Generally denoted 1, the drawing shows a driving stage for driving the two differential amplifier output stages 2 and 3 of a subscriber line interface circuit, not shown in any greater detail, for supplying a subscriber line comprising two wires A and B and being terminated by a load 4, e.g. a subscriber's station.

In the embodiment shown, the driving stage 1 comprises a current-mirroring circuit SSL for mirroring a longitudinal signal or current IL arriving at the driving stage 1, a current-mirroring circuit SST for mirroring a transversal signal or current IT arriving at the driving stage 1, a differential amplifier DFL which is connected to the current-mirroring circuit SSL, a differential amplifier DFT which is connected to the current-mirroring circuit SST, a current-dividing circuit SUK for dividing, in the embodiment shown, a reference current IR supplied to the driving stage, in a longitudinal and a transversal partial current IRL and IRT, respectively, and two voltage generators V1 and V2 for supplying the circuits in the driving stage 1 with different voltages.

The current-mirroring circuits SSL and SST as well as the differential amplifiers DFL and DFT and the current-dividing circuit SUK are conventional. Therefore, the design of these circuits will not be described more in detail in this connection even if practical embodiments of the circuits are illustrated in the blocks on the drawing, corresponding to the respective circuit.

The driving stage 1 is adapted to generate from the incoming transversal current IT, the incoming longitudinal current IL and the reference current IR, four driving currents $K1*IR-K2*IT-K3*IL$, $K1*IR+K2*IT+K3*IL$, $K1*IR+K2*IT-K3*IL$ and $K1*IR-K2*IT+K3*IL$, K1, K2 and K3 being constants of proportionality.

According to the invention, the four driving currents generated by the driving stage 1 are supplied in pairs to the two inputs of the differential amplifier output stages 2 and 3 in such a manner that the driving currents $K1*IR-K2*IT-K3*IL$ and $K1*IR+K2*IT+K3*IL$ are supplied to the output stage 3, while the driving currents $K1*IR+K2*IT-K3*IL$ and $K1*IR-K2*IT+K3*IL$ are supplied to the output stage 2.

Hereby, the output current from the output stage 2 will be proportional to IL–IT, while the output current from the output stage 3 will be proportional to IL+IT.

Thus, the incoming transversal current IT will drive the output stages 2 and 3 in anti-phase, while the incoming longitudinal current IL will drive the output stages 2 and 3 in phase.

According to the invention, the driving currents generated by the driving stage 1, are all larger than zero, i.e. they all flow into the respective differential amplifier output stage 2 and 3.

By means of the driving stage 1 in accordance with the invention, the driving currents from that stage will be supplied through the respective output stage 2 and 3 to the negative supply voltage terminal (not shown) of the respective output stage and cause a displaced idle operating point in the respective output stage. Hereby, the idle current in the upper half of the push-pull-type output stage will decrease as a function of the sum of the idle currents of the driving stage. In this manner, all or a major portion of the idle currents of the driving stage will be "recovered" as idle current in the output stage, which leads to a lower total idle power loss in the driving stage and the output stages.

We claim:

1. A driving stage for driving two differential amplifier output stages of a subscriber line interface circuit, said driving stage being adapted to generate four driving currents in dependence on transversal and longitudinal signals IT and IL, respectively, incoming to the driving stage and a reference current IR and to supply these driving currents in pairs to inputs of the two differential amplifier output stages, wherein all four of said driving currents are larger than zero.

2. The driving stage of claim 1, wherein the four driving currents are K1*IR−K2*IT−K3*IL, K1*IR+K2*IT+K3*IL, K1*IR+K2*IT−K3*IL and K1*IR−K2*IT+K3*IL, K1, K2 and K3 being constants of proportionality, the driving currents K1*IR−K2*IT−K3*IL and K1*IR+K2*IT+K3*IL being supplied to one of the differential amplifier output stages, and the driving currents K1*IR+K2*IT−K3*IL and K1*IR−K2*IT+K3*IL being supplied to the other differential amplifier output stage.

* * * * *